(12) United States Patent
Ravindranath et al.

(10) Patent No.: US 8,776,202 B2
(45) Date of Patent: Jul. 8, 2014

(54) METHOD AND APPARATUS TO SCALE AUTHENTICATED FIREWALL TRAVERSAL USING TRUSTED ROUTING POINT

(75) Inventors: Ram Mohan Ravindranath, Karnataka (IN); Muthu Arul Mozhi Perumal, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 283 days.

(21) Appl. No.: 13/083,147

(22) Filed: Apr. 8, 2011

(65) Prior Publication Data

US 2012/0260328 A1  Oct. 11, 2012

(51) Int. Cl.
*G06F 21/00* (2013.01)

(52) U.S. Cl.
USPC ........... 726/9; 726/4; 726/5; 726/11; 380/257

(58) Field of Classification Search
USPC ............................................. 726/9
See application file for complete search history.

(56) References Cited

U.S. PATENT DOCUMENTS

| | | | |
|---|---|---|---|
| 7,328,280 B2 * | 2/2008 | Takeda et al. ................. | 709/245 |
| 7,454,510 B2 * | 11/2008 | Kleyman et al. ............. | 709/231 |
| 7,472,411 B2 | 12/2008 | Wing et al. | |
| 7,693,060 B2 * | 4/2010 | Polk et al. ...................... | 370/231 |
| 8,374,188 B2 * | 2/2013 | Yahyaoui et al. ............. | 370/401 |
| 2005/0076108 A1 * | 4/2005 | Li et al. ........................... | 709/223 |
| 2006/0129676 A1 * | 6/2006 | Modi et al. .................... | 709/227 |
| 2006/0165074 A1 * | 7/2006 | Modi et al. .................... | 370/389 |
| 2007/0101414 A1 * | 5/2007 | Wing et al. ........................ | 726/5 |
| 2007/0253418 A1 * | 11/2007 | Shiri et al. ..................... | 370/392 |
| 2008/0151764 A1 * | 6/2008 | Wing et al. .................... | 370/248 |
| 2009/0316708 A1 * | 12/2009 | Yahyaoui et al. ............. | 370/401 |
| 2010/0183151 A1 | 7/2010 | Wing et al. | |
| 2010/0293297 A1 * | 11/2010 | Perumal et al. ............... | 709/245 |
| 2011/0055392 A1 * | 3/2011 | Shen et al. .................... | 709/225 |
| 2011/0270932 A1 * | 11/2011 | Chaturvedi et al. .......... | 709/206 |

* cited by examiner

*Primary Examiner* — Kambiz Zand
*Assistant Examiner* — Yonas Bayou
(74) *Attorney, Agent, or Firm* — Brinks Gilson & Lione

(57) ABSTRACT

A Trusted Routing Point (TROP) generates a signaling message that includes an authorization token used to authorize a firewall to open a pinhole. The signaling message contains a first indicator that indicates whether a data field in the signaling message represents a source address of a media flow. The signaling message also includes a second indicator that indicates whether the firewall should derive the source address of the media flow from the data field. The authorization token is generated using a one-way hash function over information that may be included in the signaling message, including the first indicator and the second indicator.

19 Claims, 4 Drawing Sheets

METHOD AND APPARATUS TO SCALE AUTHENTICATED FIREWALL TRAVERSAL USING TRUSTED ROUTING POINT

TECHNICAL FIELD

The present disclosure generally relates to network security and, more particularly, to using acceptance tokens to authorize a firewall to open a pinhole.

BACKGROUND

A computer network uses various protocols, such as real time protocol (RTP), to transport real-time media data. An example of transporting real-time media data is streaming audio and video media during a Voice over Internet Protocol VoIP telephone call. The computer network includes firewalls that block unauthorized communications from reaching destinations while permitting authorized communications to reach the destinations. Authorized communications are passed through a firewall by opening a pinhole in the firewall

DETAILED DESCRIPTION

Overview

Figure 1:
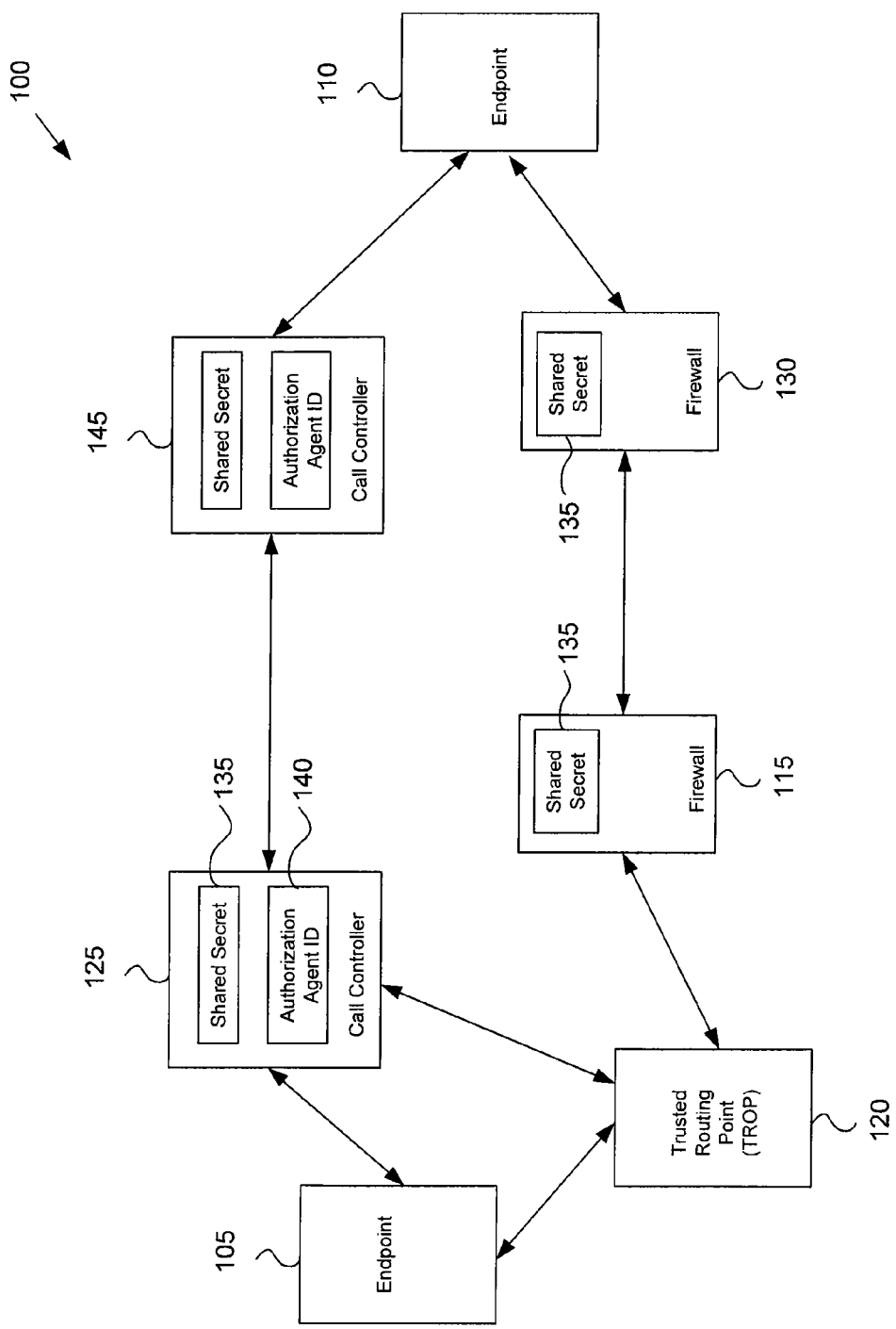
FIG. 1 illustrates an example network for using a token that authorizes a firewall to open a pinhole to allow media flow to traverse the firewall from an initiating endpoint to a destination endpoint.

A first network device generates a signaling message that includes a token that authorizes a second network device to open a pinhole to allow media flow to traverse the second network device, and a data field that identifies a source transport address of the media flow. The signaling message also includes a first indicator and a second indicator. The first indicator indicates whether the data field identifies a source transport address of the media flow. The second indicator indicates whether the second network device should derive the source transport address of the media flow from the data field. Based on the first and second indicators, the firewall may determine whether the signaling message is authentic and/or the media flow is authorized even if the source transport address of the media flow is different than a source transport address of the signaling message. The second network device determines whether the token is authentic, and if the token is authentic, then the second network device opens a pinhole in the firewall to allow the media flow to traverse the second network device.

Description of Example Embodiments

The present disclosure describes the use of a first indicator and a second indicator in a signaling message to derive a source transport address of a media flow. The first indicator indicates whether a data field in the signaling message represents the source transport address of the media flow. The second indicator indicates whether the firewall should derive the source transport address of the media flow from the data field. The signaling message also includes a token that authorizes a firewall to open a pinhole. The token may be generated using a one-way hash function over a data structure that includes the first indicator and the second indicator. With the first and second indicators, the firewall is able to determine whether the token is authentic and the media flow is authorized even though the signaling message and the media flow have different source addresses and port information. When the token is validated, the pinhole is opened, permitting network traffic, such as RTP over user datagram protocol (UDP) used for a real-time media flow, to travel through the firewall.

Various models may be used to open the pinhole. In one model, referred to as the Application Layer Gateway (ALG) model, the firewall inspects call signaling messages (e.g., Session Initiation Protocol (SIP) messages) and opens pinholes to allow the media to flow through the firewall to an intended destination. In another model, the firewall inspects media path signaling messages (e.g., Session Traversal Utilities for Network Address Translator (STUN) messages) containing Cryptographic Acceptance Tokens (CAT) and opens pinholes to allow media to flow through the firewall to the intended destination. Alternatively, the token may be included in a resource reservation protocol (RSVP) message.

Using a VoIP call as an example, a VoIP endpoint initiates a voice call providing a source transport address of the media flow to a call controller. The call controller sends a call setup request to a remote endpoint and obtains a destination transport address of the media flow. The call controller generates a data structure that includes a data field that indicates address information. The data structure also includes a first indicator that indicates whether the data structure represents the source transport address of the media flow and a second indicator that indicates whether a firewall should derive the source transport address of the media flow from the data field. In one example, the first indicator is included in the data field. A CAT that authorizes an in-path firewall to open a pinhole is also included in the data structure. The CAT is generated using a one-way hash function over at least a part of the data structure, including the first indicator and the second indicator. The call controller may also perform cryptographic hash functions using a shared secret and an authorization-agent-id to generate an unencrypted hash message authentication code (HMAC) key (UHK). The UHK may be encrypted to generate an encrypted HMAC key (EHK). The call controller provides a data structure, including the CAT, the EHK, the UHK, the data field, the first indicator, and the second indicator to a Trusted Routing Point (TROP).

The TROP generates a signaling message that authorizes a firewall to open a pinhole. The TROP may be used when the endpoints are unable to perform firewall traversal on their own. The signaling message may be a STUN message. The TROP inserts the CAT in the STUN message and includes the EHK, the CAT, the data field, the first indicator, and the second indicator. The TROP sends the STUN message toward the destination endpoint, and the STUN message is intercepted by an in-path firewall. The firewall determines whether the CAT is authentic by comparing the received HMAC key with an HMAC key that the firewall generates internally. The firewall uses the first indicator and the second indicator to determine the source transport address of the media flow. The firewall determines whether to open a pinhole by authenticating the CAT. The firewall determines whether the CAT is valid by generating its own CAT and comparing the CAT that the firewall generated with the CAT that was included in the signaling message. In addition, because the CAT was generated by performing a one-way hash function over portions of the data structure that includes the first indicator and the second indicator, the firewall is able to determine whether the first indicator and/or the second indicator are valid. Using the first indicator and the second indicator, the firewall is able to determine that the CAT is authentic and the media flow is authorized even though the STUN message and the media flow have different source addresses and port information. If the firewall determines that the CAT is authentic, then the firewall creates a pinhole that allows the media flow to pass though the firewall and toward the destination endpoint.

Instead of the TROP, other network devices and/or elements may be used to generate a signaling message that contains a token used to open a pinhole in the firewall. In one example, a trusted relay point (TRP) is used. The TRP generates a signaling message that does not include a first indicator and a second indicator. In order for the firewall to authenticate the token, the TRP uses the same source transport address as the network address translated (NATed) address of the media packets when both performing NATing of the media packets and generating the STUN messages. To perform both tasks, the TRP terminates and re-originates the media flow that the TRP receives. Terminating and re-originating the media flow splits the media flow, which may cause the TRP to become a bottleneck in the network, particularly when there is a high volume of network traffic generated by a large amount of endpoints. As a result, a TRP may cause performance, latency, and delay issues for the media flow.

One embodiment disclosed herein may be implemented as a routing program executing on a network device, e.g., a firewall or a router, configured to shield a network from malicious (or simply unwanted) network traffic. Additionally, embodiments disclosed herein may be adapted for use by other network devices, e.g., a "transparent" firewall acting as a network bridge. Additionally, the routing program may be distributed on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Other media include communications media through which information is conveyed to a computer, such as through a computer or telephone network, including wireless communications networks. The latter embodiment specifically includes storing information in non-transitory form in a buffer or other memory during or for transport over the Internet or other networks.

FIG. 1 illustrates an example network 100, according to an embodiment in the present disclosure. In network 100, a first VoIP endpoint 105 (also referred to as an initiating endpoint) initiates and maintains a VoIP telephone call with a second VoIP endpoint 110 (also referred to as a destination endpoint) using RTP over UDP media flow through the network 100. The first and second VoIP endpoints 105, 110 may be hardware or software-based IP-phones that allow a user to place or receive telephone calls. Alternatively, the first and second VoIP endpoints 105, 110 may be non-VoIP phones that are connected to a gateway having a VoIP trunk. Although network 100 shows VoIP endpoints conducting a telephone call using RTP over UDP, the techniques described herein may be adapted for use with a variety of call controllers, call managers or other media managers configured to authorize real-time data or media flows.

As shown in FIG. 1, the first VoIP endpoint 105 is located behind a first firewall 115. The second VoIP endpoint 110 is located behind a second firewall 130. Network traffic, including the media flow sent from the first VoIP endpoint 105, traverses the first firewall 115 and the second firewall 130 to reach the second VoIP endpoint 110. In one example, both the first firewall 115 and the second firewall 130 are configured to open pinholes. In another example, the first firewall 115 is configured to allow output network traffic, including the media flow, to pass without having to open a pinhole, and the second firewall 130 is configured so that a pinhole must be opened in order for traffic to pass through to the second endpoint 110. Other configurations may be used. The first and second firewalls 115, 130 may comprise any suitable routing or network device having a processor and a memory storing a routing program configured to allow, block, or route traffic through the firewall towards a destination endpoint behind the firewall.

The network 100 also includes a call controller 125 (also referred to as a call manager) that authorizes a variety of different real-time media flows. For example, the call controller 125 may be configured to act as an authorization agent for calls placed by the first VoIP endpoint 105. In the present disclosure, the call controller 125 acts as an authorization agent by generating a CAT that authorizes the first and/or second firewalls 115, 130 to open a pinhole that allows media to flow through the first and second firewalls 115, 130. The call controller 125 may further be configured to send a call setup request to the second endpoint 110 to obtain a destination transport address from the second endpoint 110. The call controller 125 may send the call setup request to the second endpoint 110 after the first endpoint 105 initiates a call. In one example, as shown in FIG. 1, the call controller 125 may obtain the destination transport address from the second endpoint 110 by sending the call setup request to a call controller 145, which is in communication with the second endpoint 110.

When the first firewall 115 and/or the second firewall 130 receives the CAT, the first firewall 115 and/or the second firewall 130 does not open a pinhole unless the first firewall 115 and/or the second firewall 130 is able to authenticate or validate the CAT. In order to generate and authenticate a CAT, a shared secret 135 and an authorization-agent-id 140 are used. The authorization-agent-id 140 is used to identify a given call controller 125. As shown in FIG. 1, the call controller 125 and the firewalls 115, 130 each know the shared secret 135. The shared secret 135 may be based on the authentication-agent-id 140. In one example, there is one shared secret per authentication-agent-id. As described in greater detail below, the call controller 125 may use the shared secret 135 and the authentication-agent-id 140, along with call-specific data, to create the CAT. In turn, the first firewall 115 and/or the second firewall 130 may use the authentication-agent-id 140 and the shared secret 135 to authenticate that the CAT was generated by the call controller 125.

The network 100 also includes a Trusted Routing Point (TROP) 120. Generally, the TROP 120 is a network element, such as a switch or a router, that performs switching and routing of the media flow. The TROP 120 may have a trusted relationship with the call controller 125. When the TROP 120 receives the media flow, the TROP 120 is configured so that termination and re-origination of the media flow by performing network address translation (NAT) of the media flow may be unnecessary. As shown in FIG. 1, the TROP 120 is located behind the first firewall 115 and traverses the media path of the first VoIP endpoint 105 and the second VoIP endpoint 110. The call controller 125 provides a CAT to the TROP 120 after the first VoIP endpoint 105 initiates a telephone call. The CAT may also include a pseudo-time that indicates when the CAT is created. The pseudo-time may reflect a monotonically increasing value used to avoid replays and to ensure that the CAT has a limited validity. Thus, an otherwise valid CAT presented to a firewall with a pseudo-time outside the validity period cannot be used to open a pinhole.

Generating the CAT may include creating a data structure that identifies a media flow to traverse the first firewall 115 and/or the second firewall 130, and performing a cryptographic hash function on at least part of the data structure. The data structure includes one or more data fields containing address information. In one example, the address information includes a candidate IP address and/or port. The data field also includes a first indicator that indicates whether the data field represents a media flow source transport address. The media flow source transport address includes a source IP address and/or a port of the media flow. If the first indicator provides a "positive" indication, then the data field represents the media flow source transport address. On the other hand, if the first indicator provides a "negative" indication, then the data field does not represent the media flow source transport address. If the data structure contains more than one data field containing address information, only one or none of the data fields has a first indicator that provides a "positive" indication.

In addition, the data structure includes a second indicator that indicates whether the first firewall 115 and/or the second firewall 130 should derive the media flow source transport address from a data field that has the first indicator providing a "positive" indication. If the second indicator provides a "positive" indication, then the first firewall 115 and/or the second firewall 130 may derive the media source transport address from the data field that has a first indicator providing a "positive" indication. On the other hand, if the second indicator provides a "negative" indication, then the first firewall 115 and/or the second firewall 130 may ignore any data field that has a first indicator providing a "positive" indication and may derive the media flow source transport address from the source transport address of a network element, such as the TROP, that is generating the STUN messages. Even if a data field has a first indicator that provides a "positive" indication, if the second indicator provides a "negative" indication, the data field having the "positive" indicator may be ignored by the first firewall 115 and/or the second firewall 130.

The first and second indicators may enable the firewall 130 to validate a CAT without the TROP 120 having to terminate and re-originate the media flow generated by the endpoints. Without the first and second indicators, the source transport address of the media flow and the source transport address of the STUN message carrying the CAT and the media flow may need to match so that the firewall can correlate the CAT with the media flow. In order to match the source transport addresses, the TROP 120 may perform NATing of the media flow, which may involve termination and re-origination of the media flow. Instead, however, by including the first and second indicators in the CAT and setting them to have "positive" indications, the firewall 130 can correlate the STUN message with the media flow and authenticate the CAT, despite the STUN message and the media flow having different source transport addresses. Thus, the TROP 120 may perform switching and routing functions without terminating and re-originating the media flow. When the TROP 120 is performing switching and routing of the media flow without terminating and re-originating the media flow, the media flow may be referred to as "flowing around" the TROP, even though the TROP 120 traverses the same media path as the media flow.

In some situations, the first indicator and/or the second indicator may not provide a "positive" indication. If the first indicator and the second indicator both provide a "negative" indication, the first firewall 115 and/or the second firewall 130 may open a pinhole with the media flow source transport address being the source transport address of the network element, such as a TRP, that is generating the STUN messages. The first indicator and the second indicator may both provide a "negative" indication in situations where network address translation is being performed (i.e., NATing), or where the STUN messages are generated using a trusted relay point (TRP). If the second indicator provides a "positive" indication, and all of the data fields have a first indicator providing a "negative" indication, the first firewall 115 and/or the second firewall 130 does not open a pinhole. As described above, if a second indicator provides a "negative" indication, any data fields having a first indicator providing a "positive" indication are ignored. In that situation, the first firewall 115 and/or the second firewall 130 opens a pinhole with the media flow source transport address being the source transport address of the network element, such as the TRP that is generating the STUN messages.

In one example, the data structure is configured as part of a flowdata attribute of a STUN packet. The flowdata attribute may be generated by the call controller 125. An example flowdata attribute is a CISCO-STUN-FLOWDATA. After the CISCO-STUN-FLOWDATA is generated, the call controller 125 may use the CISCO-STUN-FLOWDATA and the shared secret 135 to generate the CAT. The CISCO-STUN-FLOWDATA may include the data field representing the media flow source transport address, the first indicator, and the second indicator. A Candidate Address Information (CAI) field of the CISCO-STUN-FLOWDATA may be used for the data field. The first indicator may be located within the CAI and be designated by a single bit called a S-bit. The second indicator may be located in a pre-determined section in the CISCO-STUN-FLOWDATA and be designated by a single bit called a F-bit.

Figure 2:
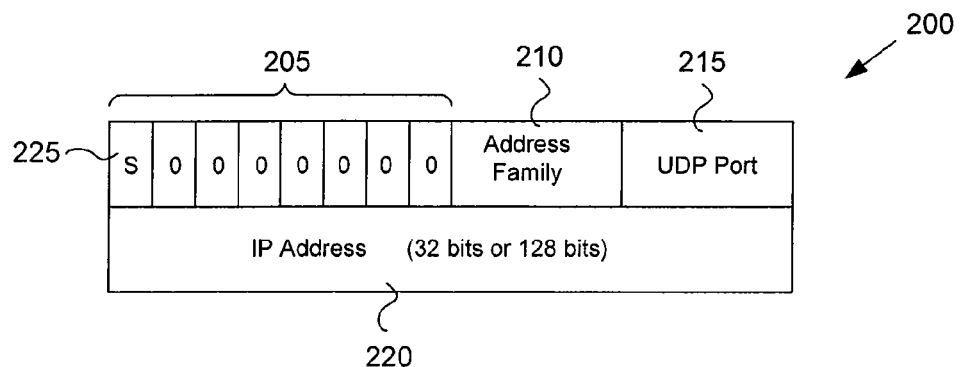
FIG. 2 illustrates a data field included in the token that identifies a source transport address of the media flow and that includes a first indicator used by a firewall in the example network of FIG. 1.

FIG. 2 shows an example layout of a CAI 200. The CAI 200 includes a flag 205, an Address Family field 210, a UDP Port field 215, and an IP Address field 220. The flag 205 includes a first bit location, such as a S-bit 225. If the S-bit 225 is set to a "positive" indication (e.g., "1" or "0"), then the CAI 200 represents the media flow source transport address. If the S-bit 225 is set to a "negative" indication (e.g., the other of "0" or "1")), then the CAI 200 does not represent the media flow source transport address. Multiple byte words may be used for indication in other embodiments. Other layouts may be used for the CAI 200.

Figure 3:
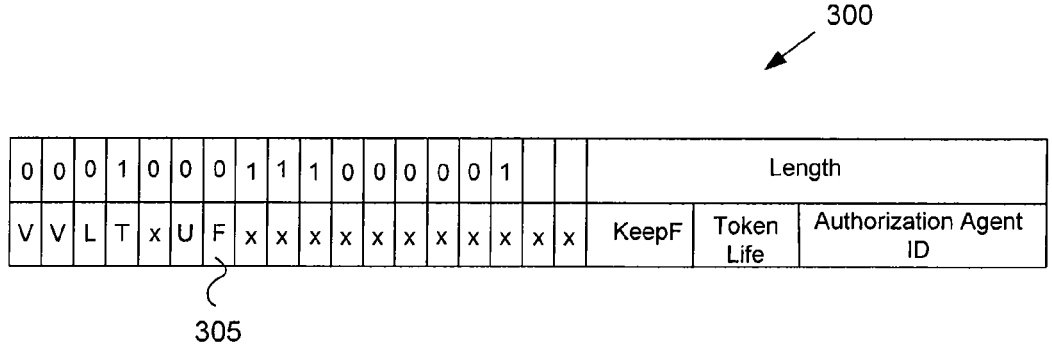
FIG. 3 illustrates another data field included in the token that includes a second indicator used by a firewall in the example network of FIG. 1.

FIG. 3 shows a second data field 300 of the CISCO-STUN-FLOWDATA that includes a second bit location, such as an F-bit 305. The second data field 300 shown in FIG. 3 may be referred to as a flowdata flag. However, other locations in the CISCO-STUN-FLOWDATA may be used. If the F-bit is set to a "positive" indication (e.g., "1" or "0"), then the first firewall 115 and/or the second firewall 130 can derive the source transport address of the media flow from CAI 200, provided that the S-bit 225 located in CAI 200 is set to a "positive" indication. However, if the F-bit is set to a "negative" indication, then the first firewall 115 and/or the second firewall 130 can derive the source transport address of the media flow from the source transport address of the source that is generating the STUN messages. As an example, if the network includes a TRP that is generating the STUN messages as described above, and the F-bit is set to "0", then the firewall 130 derives the source transport address of the media flow from the source transport address of the TRP.

After at least part of the data structure is created, including the first data field 200 and the second data field 300, a cryptographic hash function may be performed on at least part of the data structure that includes the first data field 200 and the second data field 300 to generate the CAT. The cryptographic hash function is used in order to authenticate the signaling message containing the first indicator and the second indicator. The cryptographic hash function may be a one-way hash function. In one example, the hash function is SHA-1. Other hash functions may be used. The CAT is generated using at least part of the data structure, including the first data field 200 and the second data field 300, as a first input, and a key, $K_{mac}$, as a second input. In one example, $K_{mac}$ is a hash message authentication code (HMAC) key. $K_{mac}$ may be generated using a key derivation function (KDF):

$K_{mac}$=HMAC-SHA-1 ("MAC", shared secret).

The $K_{mac}$ is used to authenticate the CAT. The message authentication code "MAC" supplied to calculate $K_{mac}$ may be determined from the flow data particular to a requested media flow. $K_{mac}$ may not be sent over the network 100, but instead may be generated internally by the call controller 125, the first firewall 115, and/or the second firewall 130 using the shared secret 135 as an input. After the CAT is generated, the CAT is included as part of the data structure. As shown in FIG. 1, because the first firewall 115 and/or the second firewall 130 also have the shared secret 135, the first firewall 115 and/or the second firewall 130 may generate their own $K_{mac}$, denoted as $K_{mac\_firewall}$. When the first firewall 115 and/or the second firewall 130 receives the signaling message that includes the data structure, the first firewall 115 and/or the second firewall 130 may generate its own CAT, denoted $CAT_{firewall}$. The first firewall 115 and/or the second firewall 130 may generate the $CAT_{firewall}$ by performing a hash function over the same portion of the data structure that was used to generate the CAT. The first firewall 115 and/or the second firewall 130 uses as inputs $K_{mac\_firewall}$ and the same portion of the data structure that was used to generate the CAT. After the $CAT_{firewall}$ is generated, the first firewall 115 and/or the second firewall 130 compares $CAT_{firewall}$ with the CAT that was included in the signaling message. If $CAT_{firewall}$ and CAT match, then the first firewall 115 and/or the second firewall 130 may determine that the signaling message that includes the CAT is authentic. After determining that the signaling message including the CAT is authentic, the first firewall 115 and/or the second firewall 130 may open a pinhole and allow the signaling message and/or the media flow to pass through the first firewall 115 and/or the second firewall 130. Also, after determining that the signaling message including the CAT is authentic, the first firewall 115 and/or the second firewall 130 may determine that the first indicator and the second indicator are authentic and may derive the source transport address of the media flow based on the indications of the first indicator and the second indicator. On the other hand, if $CAT_{firewall}$ and CAT do not match, the first firewall 115 and/or the second firewall 130 may determine that the CAT is not valid. If the CAT is not valid, then the first firewall 115 and/or the second firewall 130 may determine that the first indicator and/or the second indicator are invalid, such as, due to being tampered with. The first firewall 115 and/or the second firewall 130 may also determine not to derive the source transport address of the media flow using the first indicator and/or the second indicator.

After a pinhole is authorized, the initiating VoIP endpoint 105 may begin sending data over the authorized media flow, e.g., an RTP over UDP flow sent to/from the source and destination addresses and ports of VoIP endpoints 105 and 110. As packets encounter the firewall 115,130 with an open pinhole, the open pinhole allows the traffic to flow toward the destination endpoint 110. The CAT used to open a pinhole may have a predefined lifetime, relative to a pseudo-time at which the call controller 125 generated the CAT for a given call. Further, during that lifetime, the first firewall 115 and/or the second firewall 130 may require that keep-alive messages be received every so often for the duration of a media flow. The TROP 120 may monitor how much time has elapsed, relative to the pseudo-time of the CAT, until a current keep-alive period is about to expire. Once the keep-alive period is about to expire, the TROP 120 may determine whether a media flow is still actively sending data. If so, the TROP 120 may generate a new keep-alive message toward the destination endpoint 110 of the media flow. The first firewall 115 and/or the second firewall 130 may intercept the keep-alive message and update a value indicating when the pinhole should be closed.

A keep-alive message may be encapsulated as a STUN indication. In an exemplary embodiment, multiple STUN indications carrying the keep-alive message may be sent in order to avoid the pinhole being closed due to a dropped packet. Further, the STUN indication(s) may include two fields updated each time the TROP 120 forwards a STUN indication toward the VoIP endpoint 110. A seconds-active field may specify how many seconds media flow should remain active, from the perspective of the TROP 120 and the pseudo-time of the CAT. A validation field in the keep-alive message may include the SHA1-HMAC calculated using the seconds active field and the unencrypted HMAC key (UHK). The keep-alive message may be validated using the UHK. The call controller 125 may delegate authority to the TROP 120 via the UHK to keep a pinhole open for the lifetime of the CAT.

The first firewall 115 and/or the second firewall 130 may receive a packet carrying a keep-alive message and determine whether to extend the lifetime of the pinhole. Otherwise, if the first firewall 115 and/or the second firewall 130 does not receive (and validate) a new keep-alive message for a user-configured interval, the pinhole may be closed. The first firewall 115 and/or the second firewall 130 may receive the STUN message, and in response, determine whether a pinhole is already open. If a pinhole is already open, validation of the CAT may be unnecessary since the first firewall 115 and/or the second firewall 130 already validated the CAT when the pinhole was created. Instead, the first firewall 115 and/or the second firewall 130 may validate the keep-alive message using predetermined requirements. To do so, the firewall 115, 130 receiving the keep-alive message may determine whether the value of the seconds-active field is greater than a previously-received (and previously-validated) message. The firewall 115, 130 may also ensure that the seconds-active field does not exceed a maximum CAT duration. Provided the keep-alive message satisfies the predetermined requirements, such as the two previously described requirements, the firewall 115, 130 may validate the SHA1-HMAC-seconds-active field that is calculated using the seconds-active value and the UHK. If the SHA1-HMAC-seconds-active field passes validation, the pinhole may be kept open for an additional period, such as a user configured period specified in the seconds-active field of the keep-alive message.

When the TROP 120 generates a request for a CAT from the call controller 125, the call controller 125 may provide, in addition to the CAT, the UHK and an encrypted HMAC key (EHK) as part of the response to the request from the TROP 120 for a CAT. The UHK may be generated using $K_{mac}$. The UHK may also be generated using the first data field 200 including the first indicator and the second data field 300 including the second indicator. Another key, $K_{enc}$, may be used to create the EHK. The UHK may be encrypted using $K_{enc}$ to generate the EHK. In one example, $K_{enc}$ provides a 128-bit encryption key for creating the EHK. $K_{enc}$ may be generated using a key derivation function (KDF):

$K_{enc}$=HMAC-SHA-1 ("KEY", shared secret).

Like $K_{mac}$, $K_{enc}$ need not be sent over the network 100, and instead may be generated internally by the call controller 125, the first firewall 115, and/or the second firewall 130 using, for example, the shared secret 135 as an input. The call controller 125 may include one or both of the UHK and the EHK in the CAT along with other data elements, such as those created by the call controller 125. For example, in addition to the UHK or the EHK, the CAT may include information related to the creation of the CAT, such as keys and encryption algorithms. The CAT may also include the pseudo-time that the TROP 120 provided to the call controller 125. After generation of the CAT is complete, the call controller 125 may send the CAT, the UHK, and/or the EHK to the TROP 120.

The TROP 120 receives the CAT, including the UHK and the EHK, from the call controller 125. The TROP 120 generates a signaling message and may include the CAT in the signaling message. In addition, the TROP may include only the EHK, and not the UHK, with the CAT in the STUN message. The STUN message may also include other information, such as the source transport address of the TROP, a validity period (determined relative to the pseudo-time) and a keep alive frequency, indicating how often keep-alive messages should be sent to keep a pinhole open based on a given CAT. The TROP 120 sends the STUN message toward the destination VoIP endpoint 115, which is intercepted by the first firewall 115 and/or the second firewall 130.

The first firewall 115 and/or the second firewall 130 receives the STUN message containing the CAT, including the EHK, from the TROP 120. The shared secret 135 and/or the authentication-agent-id 140 may be shared with firewalls in a common administrative domain (e.g., the first and second firewalls 115, 130) with the call controller 125. That is, each firewall allowing pinholes based on a CAT may be supplied with the authorization-agent-id 140 and the shared secret 135. The authorization-agent-id 140 and the shared secret 135 allow the firewall to authenticate that messages have been originated by a given call controller. Similar in operation to the call controller 125, the firewall 130 may perform a cryptographic hash function using the shared secret 135 to produce its own $K_{mac}$ and $K_{enc}$ values. Using its own $K_{mac}$, the firewall 130 may generate its own unencrypted HMAC key, $UHK_{firewall}$. In addition, using its own $K_{enc}$, the first firewall 115 and/or the second firewall 130 may decrypt EHK received from the TROP 120 to produce a UHK received from the TROP 120, $UHK_{TROP}$. Using the $UHK_{TROP}$, the firewall 115, 130 may validate the SHA1-HMAC-seconds-active field received as part of the STUN message. If the firewall 115, 130 determines that the SHA1-HMAC is valid, then the pinhole is kept open for an additional period, such as an additional period specified in the seconds-active field of the keep-alive message. Because the $UHK_{TROP}$ may be generated using data fields 200, 300 that include the first indicator and the second indicator, the first firewall 115 and/or the second firewall 130 may determine if the first indicator and/or the second indicator is valid. For example, if the SHA1-HMAC-seconds-active field is not valid, then the first firewall 115 and/or the second firewall 130 may determine that the first indicator and/or the second indicator has been tampered with. The first firewall 115 and/or the second firewall 130 may determine not to derive the source transport address of the media flow using the first indicator and/or the second indicator if the SHA1-HMAC-seconds-active field is not valid.

Figure 4:
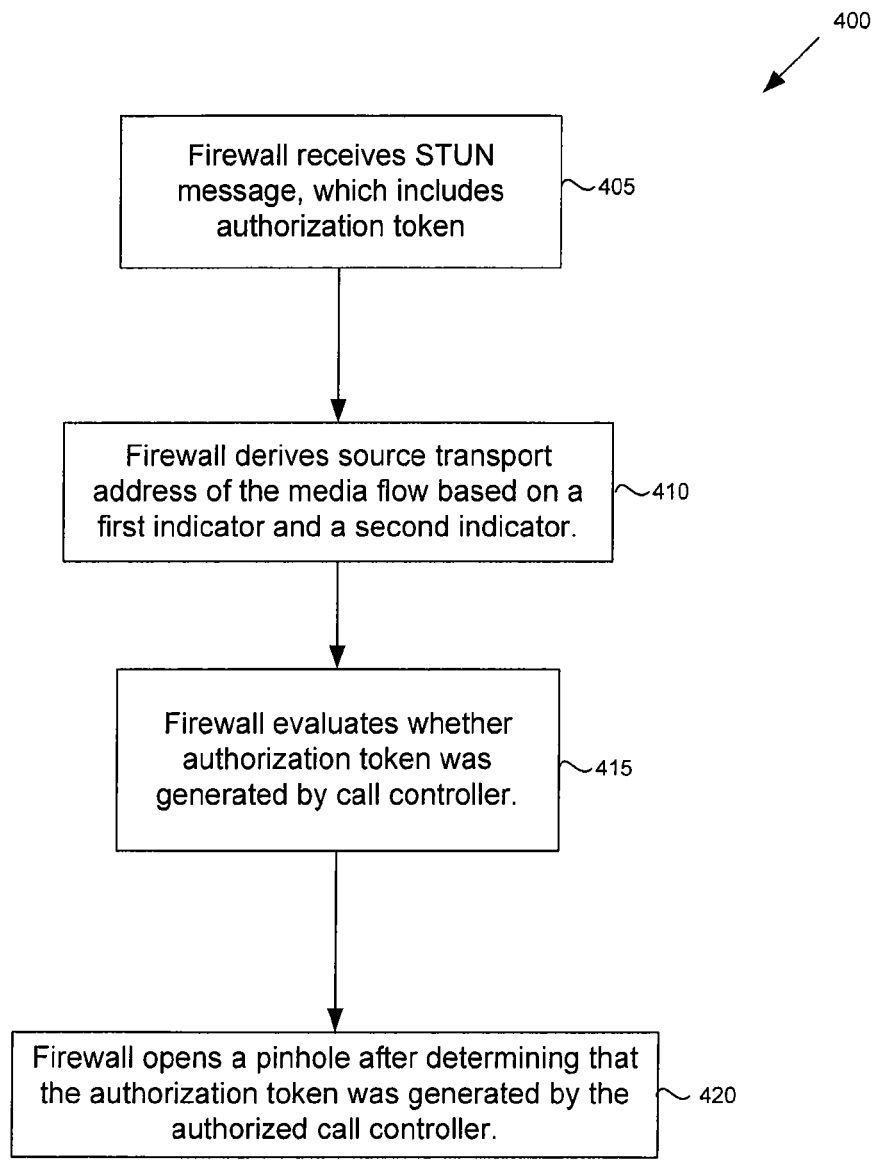
FIG. 4 illustrates an example method for using a token having the first and second indicators of FIGS. 2 and 3 to traverse a firewall.

FIG. 4 is a flow chart illustrating an example method 400 for using CATs to authorize a firewall to open a pinhole. At block 405 the firewall receives the STUN message, which includes the CAT. In block 410, the firewall derives the source transport address of the media flow based on a first indicator and a second indicator. The first indicator indicates whether a data field represents a media flow source transport address. The second indicator indicates whether the firewall should derive the source transport address of the media flow from the data field. In block 415, the firewall evaluates whether the CAT was generated by an authorized call controller, where the evaluation may be based, at least in part, on the derived source transport address of the media flow in block 410. In block 420, the firewall opens the pinhole to allow the media flow to traverse the network device from the derived source toward the destination endpoint after evaluating that the CAT was generated by the authorized call controller.

Figure 5:
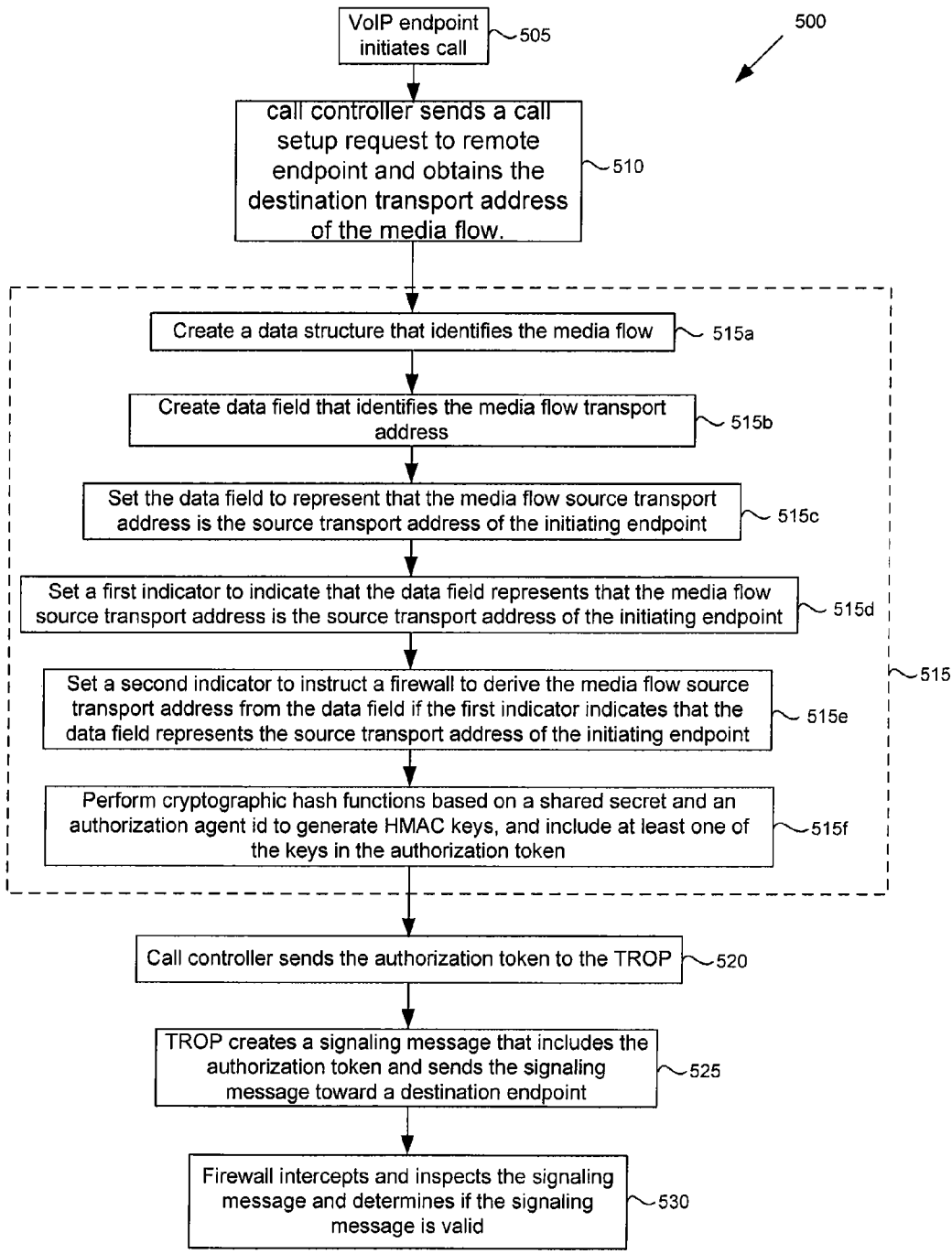
FIG. 5 illustrates an example method for generating and using a token having the first and second indicators of FIGS. 2 and 3 to traverse a firewall.

FIG. 5 is a flow chart illustrating an example method 500 used by the overall network for generating and using CATs to authorize a firewall to open a pinhole. The method 500 begins at block 505, where an endpoint initiates a call providing a source transport address of the media flow to a call controller. At block 510, the call controller sends a call setup request to the remote endpoint and obtains the destination transport address of the media flow. At block 515, the call controller prepares the CAT and sends the CAT to the TROP to authorize an in-path firewall to open a pinhole that allows media flow to traverse the in-path firewall towards a destination endpoint. Within block 515, the call controller performs the activities of blocks 515a-515f. At block 515a, the call controller creates a data structure that identifies a media flow to traverse a firewall. At block 515b, the call controller creates a data field that represents or identifies a media flow source transport address. At block 515c, the call controller sets the data field to represent that the media flow source transport address is the source transport address of an initiating endpoint.

At block 515d, the call controller sets a first indicator to indicate that the data field represents that the media flow source transport address is the source transport address of the initiating endpoint. At block 515e, the call controller sets a second indicator to instruct a firewall to derive the media flow source transport address from the data field if the first indicator indicates that the data field represents the source transport address of the initiating endpoint.

At block 515f, the call controller performs cryptographic hash functions based on a shared secret and an authorization-agent-id over at least part of the data structure, including the data fields having the first indicator and the second indicator, to generate the CAT and a UHK. Also at block 515f, the UHK may be encrypted to generate an EHK.

At block 520, the call controller sends the CAT including at least one of the UHK and the EHK, to the TROP. At block 525, the TROP generates a signaling message, such as a STUN message, that includes the CAT. The signaling message may also include the EHK but not the UHK. The TROP then sends the STUN message toward a destination endpoint on the media path.

At block 530, a firewall intercepts the STUN message and uses the shared secret and authorization-agent-id to inspect the STUN message. The firewall determines whether the CAT is valid and whether to open a pinhole to allow the media flow to pass through. By determining that the CAT is valid, the firewall is also able to determine that the first indicator and the second indicator are valid.

Referring back to FIG. 1, after a pinhole is authorized, the initiating endpoint 105 and the destination endpoint 110 begin sending data over the authorized media flow, e.g., an RTP over UDP. As media packets encounter the first firewall 115 and/or the second firewall 130, the opened pinhole allows the media packets to traverse the first firewall 115 and/or the second firewall 130. The authorization message used to authorize the firewall to open a pinhole may have a predefined lifetime, relative to a pseudo-time at which a call controller generated the CAT for a given call. Further, during that lifetime, a firewall may require that keep-alive messages be received every so often for the duration of a media flow (e.g., every thirty seconds for a VoIP call sent using UDP over RTP).

The call controller 125 may delegate authority to the TROP (via the UHK) to keep a pinhole open for the lifetime of the CAT. If the media flow is to exist for longer than the lifetime of the CAT, then the media flow is reauthorized with a new CAT. Once the CAT is about to expire, the TROP may send a request to the call controller to reauthorize the media flow with another CAT. In response, the call controller may generate a new CAT to be returned to the TROP 120. The new CAT may be generated using the same techniques used to generate the original CAT, as described above. For example, the call controller 125 may generate a new UHK and a new EHK and may send the new UHK and EHK to the TROP 120. The TROP 120 forwards the new CAT toward the media flow destination endpoint 110 and the new CAT is intercepted by an in-path firewall, such as the first firewall 115 and/or the second firewall 130. After the new CAT is received, the firewall 130 validates the new CAT, as described above. If the new CAT is validated, the firewall updates the maximum pinhole lifetime. The firewall 130 then resets the maximum lifetime based on information in the new CAT.

Various embodiments described herein can be used alone or in combination with one another. The foregoing detailed description has described only a few of the many possible implementations of the present invention. For this reason, this detailed description is intended by way of illustration, and not by way of limitation.

What is claimed is:

1. A method comprising:
   receiving, with a first network device from a second network device, a signaling message to open a pinhole that, when open, allows a media flow originating from a source endpoint and received from the second network device to pass through the first network device toward a destination endpoint, the signaling message comprising: a token that authorizes the first network device to open the pinhole; a data field that identifies a source transport address of the source endpoint; a first indicator; and a second indicator;
   determining, with the first network device, a media flow source transport address for the first network device to use to allow the media flow originating from the source endpoint and received from the second network device to pass through toward the destination endpoint when the pinhole is open, wherein determining the media flow source transport address comprises determining the media flow source transport address to be the source transport address of the source endpoint identified in the data field instead of a source transport address of the second network device from which the signaling message was received in response to the first indicator indicating that the data field represents the source transport address of the source endpoint and the second indicator indicating that the first network device should determine the media flow source transport address from the data field;
   opening the pinhole in response to determining that the token is authentic;
   receiving, with the first network device from the second network device, the media flow identifying the source transport address of the source endpoint instead of the source transport address of the second network device; and
   when the pinhole is open, sending, with the first network device, the media flow identifying the source transport address of the source endpoint toward the destination endpoint.

2. The method of claim 1, wherein determining, with the first network device, the media flow source transport address further comprises determining the media flow source transport address to be the source transport address of the second network device in response to the second indicator not indicating to the first network device to determine the media flow source transport address from the data field.

3. The method of claim 1, wherein the signaling message further comprises a second data field identifying the source transport address of the second network device.

4. The method of claim 1, further comprising validating the source transport address of the source endpoint in response to determining that the token is authentic.

5. The method of claim 1, wherein the signaling message is a first signaling message, the token is a first token, and the method further comprises:
   receiving, with the first network device, a second signaling message comprising a second token, wherein the second token comprises a third indicator and a fourth indicator;
   revalidating, with the first network device, the source transport address of the source endpoint based on the third indicator and the fourth indicator; and
   updating, with the first network device, a maximum lifetime of the pinhole based on evaluating that the second token is authentic.

6. The method of claim 1, wherein receiving the media flow comprises receiving, with the first network device from the second network device, the media flow without the second network device terminating and re-originating the media flow to identify the source transport address of the second network device.

7. A system comprising:
   a first network device configured to:
   receive a signaling message from a second network device to open a pinhole that, when open, allows a media flow originating from a source endpoint and received from the second network device to pass through the first network device toward a destination endpoint, the signaling message comprising: a token providing authorization to the first network device to open the pinhole; a data field that identifies a source transport address of the source endpoint; a first indicator; and a second indicator;
   determine a media flow source transport address for the first network device to use to allow the media flow originating from the source endpoint and received from the second network device to pass through toward the destination endpoint when the pinhole is open, wherein the first network device is configured to determine the media flow source transport address to be the source transport address of the source endpoint instead of the source transport address of the second network device from which the signaling message was received in response to the first indicator indicating that the data field represents the source transport address of the source endpoint and the second indicator indicating that the first network device should determine the media flow source transport address from the data field;

open the pinhole in response to an evaluation that the token is authentic;

receive from the second network device the media flow identifying the source transport address of the source endpoint instead of identifying the source transport address of the second network device; and when the pinhole is open, send the media flow toward the destination endpoint.

8. The system of claim 7, wherein the first network device is further configured to determine the media flow source transport address to be the source transport address of the second network device in response to the second indicator not indicating to the first network device to determine the source transport address of the media flow from the data field.

9. The system of claim 7, further comprising:
a call controller configured to:
set the first indicator to have a first positive indication, the first positive indication indicating that the source transport address of the media flow is the source transport address of the initiating endpoint; and
set the second indicator to have a second positive indication, the second positive indication instructing the first network device to determine the source transport address of the media flow from the data field in response to the first indicator having the first positive indication.

10. The system of claim 7, wherein the data field comprises a first data field, and wherein the signaling message further comprises a second data field identifying the source transport address of the second network device.

11. The system of claim 7, further comprising the second network device, wherein the second network device is configured to insert the token in the signaling message prior to transmission of the signaling message to the first network device.

12. The system of claim 7, wherein the first indicator comprises a first bit and the second indicator comprises a second bit, and wherein the first network device is configured to determine the media flow source transport address from the data field based on logic values of the first bit and the second bit.

13. The system of claim 7, wherein the signaling message is a first signaling message, the token is a first token, and the first network device is further configured to:
receive a second signaling message comprising a second token, a third indicator and a fourth indicator;
revalidate the source transport address of the source endpoint based on the third indicator and the fourth indicator; and
update a maximum lifetime of the pinhole based on an evaluation that the second token is authentic.

14. The system of claim 7, wherein the first network device is configured to receive the media flow from the second network device without the media flow having been terminated and re-originated by the second network device to identify the source transport address of the second network device.

15. Non-transitory computer readable storage media encoded with software comprising computer instructions executable by a processor, the instructions comprising:

instructions executable by a first network device to receive a signaling message from a second network device to open a pinhole that, when open, allows a media flow originating from a source endpoint and received from the second network device to pass through the first network device toward a destination endpoint, the signaling message comprising: a token authorizing the first network device to open the pinhole; a data field comprising a source transport address of the source endpoint; a first indicator; and a second indicator;

instructions executable by the first network device to determine a media flow source transport address for the first network device to use to allow the media flow originating from the source endpoint and received from the second network device to pass through toward the destination endpoint when the pinhole is open, wherein the first network device, when executing the instructions, determines the media flow source transport address to be the source transport address of the source endpoint instead of a source transport address of the second network device from which the signaling message was received in response to the first indicator indicating that the data field represents the source transport address of the source endpoint and the second indicator indicating that the first network device should determine the media flow source transport address from the data field;

instructions executable by the network device to validate the token;

instructions executable by the first network device to open the pinhole in response to validation of the token; and instructions executable by the first network device to, upon receipt of the media flow from the second device identifying the source transport address of the source endpoint instead of the source transport address of the second network device, send the media flow toward the destination endpoint when the pinhole is open.

16. The non-transitory computer readable storage media of claim 15, wherein the token is a first token, and wherein the instructions to validate the first token comprises:
instructions to perform a hash function over a portion of the signaling message comprising the first indicator and the second indicator to generate a second token; and
instructions to compare the first token included in the signaling message with the second token.

17. The non-transitory computer readable storage media of claim 16, further comprising:
instructions to determine the media flow source transport address to be the source transport address of the second network device in response to the second indicator not indicating to the first network device to determine the media flow source transport address from the data field.

18. The non-transitory computer readable storage media of claim 16, wherein the signaling message is a first signaling message, the token is a first token, and the instructions further comprising:
instructions to receive a second signaling message comprising a second token, a third indicator and a fourth indicator;
instructions to revalidate the source transport address of the source endpoint based on at least one of the third indicator and the fourth indicator, and
instructions to maintain the pinhole as open based on evaluation that the second token was generated by a call controller.

19. The non-transitory computer readable storage media of claim 15, further comprising instructions executable by the first network device to receive the media flow from the second network device without the second network device having terminated and re-originated the media flow.

* * * * *